United States Patent
Katz

[19]

[11] Patent Number: 6,127,662

[45] Date of Patent: Oct. 3, 2000

[54] ELECTROFUSION METHOD AND DEVICE

[75] Inventor: Oded Katz, Menashe, Israel

[73] Assignee: Plasson Maagan Michael Industries Ltd, Kibbutz Maagan Michael, Israel

[21] Appl. No.: 09/039,225

[22] Filed: Mar. 16, 1998

Related U.S. Application Data

[62] Division of application No. PCT/IL96/00113, Sep. 18, 1996.

[30] Foreign Application Priority Data

Sep. 20, 1995 [IL] Israel .......................................... 115364

[51] Int. Cl.[7] .............................. B29C 65/34; F16L 47/02
[52] U.S. Cl. ...................... 219/544; 219/535; 156/274.2; 156/304.2; 285/21.2; 285/41
[58] Field of Search ..................................... 219/633, 621, 219/243, 535, 544; 285/104, 21.1, 21.2, 41; 264/25; 428/136; 156/304.2, 273.9, 274.2

[56] References Cited

U.S. PATENT DOCUMENTS

| | | | |
|---|---|---|---|
| 4,029,837 | 6/1977 | Leatherman | 428/247 |
| 4,493,985 | 1/1985 | Keller | 219/544 |
| 5,030,487 | 7/1991 | Rosenzweig | 428/34.9 |
| 5,141,580 | 8/1992 | Dufour et al. | 219/535 |
| 5,150,922 | 9/1992 | Nakashiba et al. | 285/21 |
| 5,277,456 | 1/1994 | Mer et al. | 285/21.1 |

FOREIGN PATENT DOCUMENTS

| | | |
|---|---|---|
| 2516439 | 5/1983 | France . |
| 53-57276 | 5/1978 | Japan . |
| 3-71824 | 3/1991 | Japan . |
| 4-83992 | 3/1992 | Japan . |
| 7-253187 | 10/1995 | Japan . |
| 0695027 | 8/1953 | United Kingdom . |
| 9424478 | 10/1994 | WIPO . |

OTHER PUBLICATIONS

"New Techniques for Joing Dissimiliar Materials" Welding Review International vol. 12, No. 1, pp. 40–42, Feb. 1993.
European Patent Office Publication No. JP59184611 A 841020 DW 8448.
European Patent Office Publication No. JP 57044879 B820924 DW 8242 JP 52007016 A 770119 DW 8242.
European Patent Office Publication No. JP 7253187 of Mar. 10, 1995.

*Primary Examiner*—John A. Jeffrey
*Attorney, Agent, or Firm*—Benjamin J. Barish

[57] ABSTRACT

A method of joining a first pipe of a plastic material to a second pipe of a material which does not bond well to the plastic material, utilizes an electrofusion sleeve of a plastic material which bonds well to the plastic material of the first pipe and having a first coil of electrical heater wire on the inner surface at one end of the sleeve to receive the first pipe and a second coil of electrical heater wire on the inner surface at the opposite end of the sleeve to receive the second pipe. The opposite end of the sleeve includes a bonding material capable of producing a good bond, when activated by heat, between the materials of the sleeve and of the second pipe. The two pipes are inserted into the two ends of the sleeve, and electrical current is applied to the two coils to cause the first end of the sleeve to bond by electrofusion to the first pipe, and the second end of the sleeve to bond by electrofusion and by the bonding material to the second pipe.

18 Claims, 1 Drawing Sheet

ELECTROFUSION METHOD AND DEVICE

This application is a divisional of PCT/IL96/00113 filed Sep. 18, 1996.

The present invention relates to a method and device to join together two or more pipes by electrofusion.

Electrofusion is a technique for joining two pipes together by means of sleeves having coils of electrical heater wire such that the two pipes to be joined are inserted into the opposite ends of the sleeve, and then electrical current is applied to the coils to fuse the outer surfaces of the two pipes to the sleeve. This technique is widely used to join together pipes made of the same plastic material, or of plastic materials which bond well to each other by heat. In such cases, the electrofusion sleeve is made of the same material as the plastic pipes, or of a material which bonds well to that of the plastic pipes by electrofusion.

There are applications, however, where it is necessary to join a pipe of a plastic material which does not bond well to a pipe of another material, plastic or metal. For example, polyolefins, e.g., polyethylene, polypropylene and polybutylene, are very difficult to bond to many other materials, such as nylons (polyamides) and polyvinychloride, and therefore the electrofusion technique has not generally been used in such applications. As a result, mechanical coupling devices are generally used for pipes of polyethylene or of other materials which do not bond well to other plastics or to metal.

An object of the present invention is to provide an electrofusion method and device for joining a pipe made of a plastic material which generally does not bond well to pipes of other plastics or of metal.

According to one aspect of the present invention, there is provided a method of joining a first pipe of a plastic material to a second pipe of a material which does not bond well to the plastic material, comprising: providing an electrofusion sleeve of a plastic material which bonds well to the plastic material of the first pipe, the electrofusion sleeve having a first coil of electrical heater wire on the inner surface at one end of the sleeve to receive the first pipe and a second coil of electrical heater wire on the inner surface at the opposite end of the sleeve to receive the second pipe; and applying to the opposite end of the electrofusion sleeve a bonding material capable of producing a good bond, when activated by heat, between the materials of the electrofusion sleeve and the second pipe. The bonding material is applied so as to be between, and in contact with, the second coil and the second pipe when the second pipe is inserted into the opposite end of the electrofusion sleeve. The first pipe is inserted into the first end of the electrofusion sleeve, and the second pipe into the opposite end of the electrofusion sleeve; and electrical current is applied to the first and second coils to cause the first coil to heat the first end of the sleeve to bond by electrofusion to the first pipe, and the second coil to activate the bonding material and to bond the opposite end of the sleeve to the second pipe by electrofusion via the bonding material.

According to further features in one described preferred embodiment, the bonding material is provided in the form of a layer, preferably a coating, on the electrical heater wire of the second coil; and in a second described embodiment, it is provided as a preformed film over the second coil to contact the second pipe when inserted into the opposite end of the sleeve.

Preferred examples of the materials that can be used for the two pipes are a polyolefin, preferably polyethylene, for the plastic material of the first pipe, and a nylon (polyamide) for the material of the second pipe. In such an application, the electrofusion sleeve would also be made of polyethylene. The invention, however, could also be used with plastic pipes of other materials that do not bond well to each other, e.g., with polypropylene for the first pipe and/or another polar material for the second pipe.

The thermoplastic bonding material is preferably a polyolefin based copolymer containing active polar groups which, upon application of heat energy, develop a free radical which then forms a bond with any polar group or polar material in contact with it. One such material is PE (polyethylene) copolymer with maleic anhydride

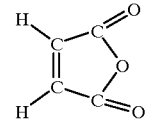

which is derived from maleic acid minus $H_2O$. Another is EVA with maleic anhydride. Commercial formulations of such materials are known.

The invention also provides a device for joining by electrofusion pipes of a plastic material which does not bond well to other plastic materials or to metals.

Further features and advantages of the invention will be apparent from the description below.

The invention is herein described, by way of example only, with reference to the accompanying drawings, wherein.

Figure 3:
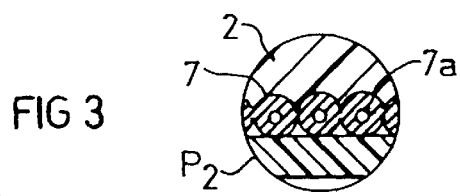
FIG. 3 is an enlarged fragmentary view illustrating the construction of the second coil of electrical heater wire at the opposite end of the electrofusion sleeve.
Figure 4:
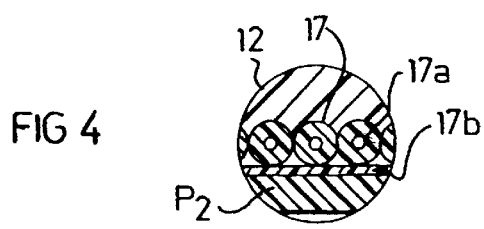

and FIG. 4 illustrates a modification in the construction of the second coil of electrical heater wire of FIG. 3.

Figure 1:
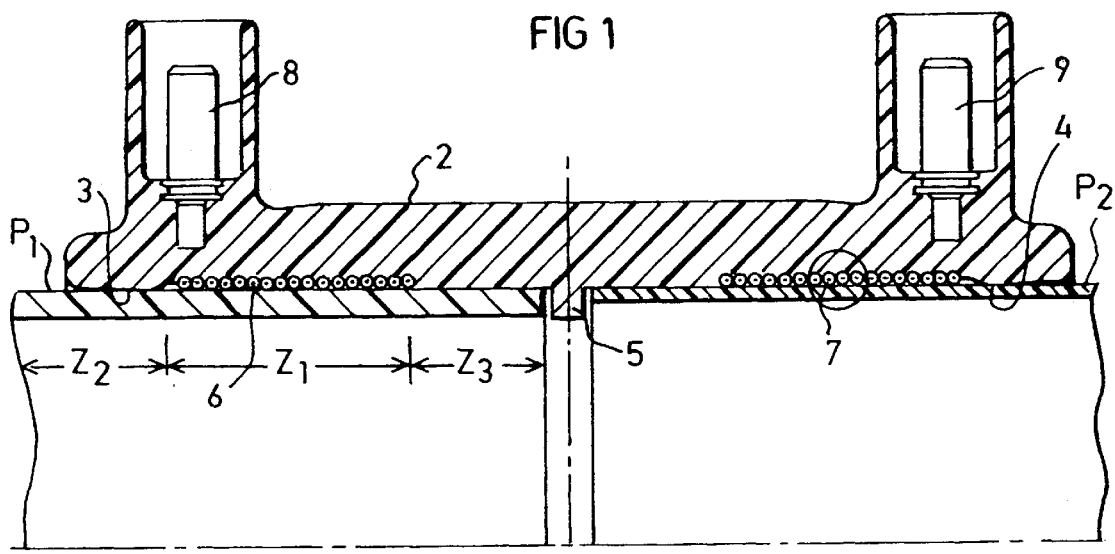
FIG. 1 is a longitudinal half-sectional view illustrating one form of electrofusion sleeve constructed in accordance with the present invention.

The electrofusion fitting illustrated in FIG. 1 comprises an electrofusion sleeve 2 of a thermoplastic material formed with a socket 3 at one end for receiving a first plastic pipe $P_1$, and a socket 4 at the opposite end for receiving a second pipe $P_2$ to be joined to the first pipe by electrofusion. The two sockets 3, 4, are preferably separated by an annular shoulder 5 (or other projection) to limit the insertion of the two pipes into their respective sockets with the two pipes coaxially aligned with each other and with the electrofusion sleeve.

The electrofusion sleeve 2 includes a first coil 6 of electrical heater wire on the inner surface at one end of the sleeve to receive pipe $P_1$ when inserted into socket 3, and a second coil 7 (preferably a section of coil 6) of electrical heater wire on the inner surface at the opposite end of the sleeve to receive pipe $P_2$ when inserted into socket 4. Sleeve 2 further includes electrical terminals 8, 9 for applying electrical heating current to coils 6, 7, to melt the inner surfaces of the sleeve, and the outer surfaces of the plastic pipes received therein, and thereby to bond them together by electrofusion.

Figure 2:
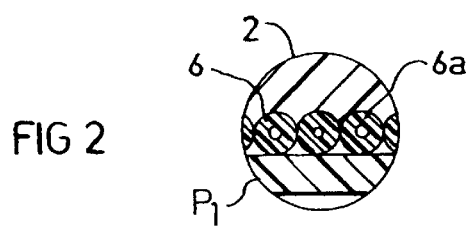
FIG. 2 is an enlarged fragmentary view illustrating the construction of the first coil of electrical heater wire at one end of the electrofusion sleeve of FIG. 1.

The construction and manner of using electrofusion fittings, insofar as described above, are well known for bonding together pipes made of the same plastic material, or of plastic materials which are easily bondable together by electrofusion. However, this technique is not generally used for joining plastic pipes which are not easily bondable together by electrofusion, such as joining a pipe of a polyolefin (e.g., polyethylene) with a pipe of another material not easily bondable to polyethylene, such as nylon (polyamide) or other polar plastic, or metal. The electrofusion fitting illustrated in FIG. 1, particularly as further described with respect to FIGS. 2–4, is especially constructed to enable bonding together by electrofusion pipes made of one material, e.g., polyethylene, with another material, e.g., a polar plastic or a metal, not normally bondable to polyethylene.

In the example described below, it will be assumed that pipe $P_1$ received within socket 3 is made of polyethylene, and $P_2$ received in socket 4 is made of another plastic material, such as a nylon (polyamide), normally not directly bondable to the material of pipe $P_1$.

In this example, the electrofusion sleeve 2 is also made of polyethylene. The electrical heater wire of coil 6 is also coated with polyethylene, as shown by coating 6a in FIG. 2. Thus, when electrical current is applied to coil 6, its polyethylene coating 6a melts in the fusion zone $Z_1$, and similarly the adjacent surfaces of the sleeve 2 and the pipe within socket 3, also melt in this zone to produce an integral bond between the polyethylene of sleeve 2, of wire coating 6a, and of the polyethylene in the plastic pipe $P_1$ received in socket 3. Zones $Z_2$ and $Z_3$ on opposite sides of zone $Z_1$ are colder zones in which fusion generally does not take place.

However, since pipe $P_2$ is of a material not normally bondable to polyethylene (being polyamide in this example), coil 7 enclosing socket 4 in the opposite side of sleeve 2 to receive pipe $P_2$, is not constructed in exactly the same manner as coil 6. Thus, as shown in FIG. 3, the electrical heater wire of coil 7 includes an outer layer 7a, preferably in the form of a coating, of a bonding material which, when activated by the heat generated in coil 7, is capable of producing a good bond between the polyethylene of sleeve 2, and the polyamide of pipe $P_2$. Particularly good results have been obtained when the outer coating 7a is a polyolefin based copolymer containing active polar groups which, upon application of heat energy, develop a free radical which then forms a bond with any polar group or polar material in contact with it. One such material is PE (polyethylene) copolymer with maleic anhydride

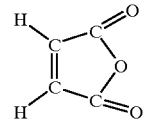

which is derived from maleic acid minus $H_2O$. Another is EVA ethylene vinyl acetate with maleic anhydride.

When the electrical current is applied to coil 7, its outer coating 7a is activated to produce a firm bond between the polyethylene of sleeve 2 and the polyamide of pipe $P_2$ in the fusion zone underlying coil 7, corresponding to zone $Z_1$ underlying coil 6 at the end of the sleeve receiving pipe $P_1$.

The foregoing technique also better assures a firm bond to the coating 7a and the coil wire 7, thereby decreasing or eliminating the possibility of the occurrence of a leak path between the coating and the wire, which can be especially dangerous in gaseous fuel applications.

FIG. 4 illustrates a variation wherein the bonding material, capable of producing a good bond between the polyethylene of the fitting and the material (e.g., polyamide) of plastic pipe $P_2$, is provided as a preformed film over coil 7 to contact pipe $P_2$ when inserted into socket 4.

Thus, as shown in the fragmentary view of FIG. 4, the electrofusion sleeve 12 is also made of polyethylene as described above, but in this case the electrical heater wire of coil 17, at the end of the sleeve formed with socket 4 to receive pipe $P_2$, is also coated with polyethylene 17a (rather than with the bonding material), and the bonding material is applied as a preformed film 17b for the whole stretch of coil 17. Film 17b of the bonding material thus serves as an interface between the polyethylene coating 17a and the plastic of pipe $P_2$. When electrical current is applied to coil 17, the polyethylene coating 17a melts so as to become integrally bonded to the polyethylene of the sleeve 12; and the bonding material of the preformed film 17b becomes heat-activated to produce a good bond between the polyethylene coating 17a and the adjacent surface of the polyamide plastic pipe $P_2$.

It will be appreciated that in the variation of FIG. 4, the construction of the electrofusion sleeve 12, and of the coil at the opposite end of the sleeve to receive the plastic pipe $P_1$, are otherwise the same as described above.

The good bond between the wire and the pipe, as described above with respect to FIGS. 3 and 4, also substantially reduces the possibility of a leakage path occurring along the wire between it and the plastic pipe, which can be especially dangerous with respect to plastic pipes conducting pressurized gaseous fuel.

While the invention has been described with respect to two preferred embodiments, it will be appreciated that these are set forth merely for purposes of example, and that many other variations, modifications and applications of the invention may be made.

What is claimed is:

1. A method of joining a first pipe of a plastic material to a second pipe of a material which does not bond well to said plastic material, comprising:

providing an electrofusion sleeve of a plastic material which bonds well to the plastic material of said first pipe, said electrofusion sleeve having a first coil of electrical heater wire on the inner surface at one end of the sleeve to receive said first pipe and a second coil of electrical heater wire on the inner surface at the opposite end of the sleeve to receive said second pipe;

applying to said opposite end of the electrofusion sleeve a bonding material capable of producing a good bond, when activated by heat, between the materials of said electrofusion sleeve and said second pipe, said bonding material being applied so as to be between, and in contact with, said second coil and said second pipe when the second pipe is inserted into said opposite end of the electrofusion sleeve;

inserting said first pipe into said first end of the electrofusion sleeve, and said second pipe into said opposite end of the electrofusion sleeve;

and applying electrical current to said first and second coils to cause said first coil to heat said first end of the sleeve to bond by electrofusion to said first pipe, and said second coil to activate said bonding material and to bond said opposite end of the sleeve to said second pipe by electrofusion via said bonding material.

2. The method according to claim 1, wherein said second pipe is also of a plastic material.

3. The method according to claim 1, wherein said bonding material is in the form of a layer on the electrical heater wire of said second coil.

4. The method according to claim 3, wherein said bonding material is coated over the electrical heater wire of said second coil.

5. The method according to claim 1, wherein said bonding material is a preformed film over said second coil in contact said second pipe when inserted into said opposite end of the sleeve.

6. The method according to claim 1, wherein said first plastic material is a polyolefin.

7. The method according to claim 6, wherein said first plastic material is polyethylene.

8. The method according to claim 6, wherein said bonding material is a polyolefin based copolymer containing active polar groups which, upon application of heat, develop free radicals forming bonds with polar groups of the polyolefin in contact with the bonding material.

9. The method according to claim 8, wherein said bonding material is a polyethylene copolymer which includes maleic anhydride as the active ingredient.

10. The method according to claim 1, wherein said electrofusion sleeve is made, and said first coil of electrical heater wire is coated, with the same plastic material as said first pipe.

11. A device for joining a first pipe of a plastic material to a second pipe of a material which does not bond well to said plastic material, comprising:

an electrofusion sleeve made of a plastic material which bonds well to the plastic material of said first pipe, said electrofusion sleeve having a first coil of electrical heater wire on the inner surface at one end of the sleeve to receive said first pipe and a second coil of electrical heater wire on the inner surface at the opposite end of the sleeve to receive said second pipe;

a bonding material, capable of producing a good bond when activated by heat, applied to said opposite end of the electrofusion sleeve so as to be between, and in contact with, said second coil and said second pipe when inserted into said opposite end of the electrofusion sleeve;

and terminals for applying electrical current to said first and second coils to cause said first coil to heat said first end of the sleeve to bond by electrofusion to said first pipe, and said second coil to activate said bonding material and to bond said opposite end of the sleeve to said second pipe by electrofusion via said bonding material.

12. The device according to claim 11, wherein said bonding material is a thermoplastic material.

13. The device according to claim 12, wherein said bonding material is in the form of a layer on the electrical heater wire of said second coil.

14. The device according to claim 13, wherein said bonding material is coated over the electrical heater wire of said second coil.

15. The device according to claim 12, wherein said bonding material is a preformed film over said second coil to contact said second pipe when inserted into said opposite end of the sleeve.

16. The device according to claim 11, wherein said first plastic material is polyolefin, and said bonding material is a polyolefin based copolymer with active polar groups which, upon application of heat, develop free radicals forming bonds with polar groups of the polyolefin in contact with the bonding material.

17. The device according to claim 16, wherein said bonding material is a polyethylene copolymer which includes maleic anhydride as the active ingredient.

18. The device according to claim 11, wherein said electrofusion sleeve is made, and said first coil of electrical heater wire is coated, with the same plastic material as said first pipe.

\* \* \* \* \*